United States Patent

Manion et al.

[15] 3,674,667
[45] July 4, 1972

[54] PROCESS FOR INCREASING WATER REPELLENCY OF COTTON CLOTH

[72] Inventors: Jean P. Manion, Milwaukee; Daniel J. Davies, Mukwonago, both of Wis.

[73] Assignee: Allis-Chalmers Manufacturing Company, Milwaukee, Wis.

[22] Filed: Aug. 1, 1969

[21] Appl. No.: 846,767

[52] U.S. Cl. ..........................204/165, 8/120, 117/93.1 R, 204/169
[51] Int. Cl. .....................................B01k 1/00, D06m 13/08
[58] Field of Search ...........204/169; 117/93.1 CD, 93.1 GD; 8/120

[56] References Cited

UNITED STATES PATENTS

| | | | |
|---|---|---|---|
| 3,252,830 | 5/1966 | Cummin et al. | 117/217 |
| 3,494,845 | 2/1970 | Osborn et al. | 204/169 |
| 3,255,099 | 6/1966 | Wolinski | 204/169 |
| 3,275,540 | 9/1966 | McBride | 204/165 |
| 3,485,734 | 12/1969 | Pecka | 204/165 |

Primary Examiner—F. C. Edmundson
Attorney—Arthur M. Streich, Robert B. Benson and John P. Hines

[57] ABSTRACT

A manufactured material and a process for making the material is disclosed. The manufactured material is a hydrogen containing substance having a fluorinated surface and in which hydrogen atoms, which may be present in hydroxyl radicals attached to a carbon atom chain, have been replaced in the surface of the material by fluorine atoms or radicals, and with such fluorinated surface of the material containing at least about 2 micrograms of such fluorine per $cm^2$ of surface area. The process for making such a material includes the steps of selecting a substrate containing hydrogen atoms which may be present in hydroxyl radicals attached to a carbon atom chain, selecting a gas containing fluorine atoms or radicals, placing the selected substrate between electrodes in a flowing atmosphere of the selected gas at subatmospheric pressure, and subjecting the substrate to an electrodeless discharge of at least about 0.2 KWH/$yard^2$ to chemically activate both the surface of the substrate and the gas, and exchange the fluorine atoms or radicals for surface hydrogen atoms or radicals to produce a material with a surface, which compared to the substrate before this process treatment, is more water repellent (without sealing pores), is more corrosion and soil resistant, more chemically inert, and more like the relatively expensive polytetrafluoro-ethylene. When the substrate is a material having a relatively inert surface, such as polyethylene, the process is disclosed as including an initial treatment step that involves ion bombardment of the substrate in helium gas to activate the surface before the surface is treated in the fluorine containing gas.

3 Claims, 6 Drawing Figures

PATENTED JUL 4 1972
3,674,667
SHEET 1 OF 2
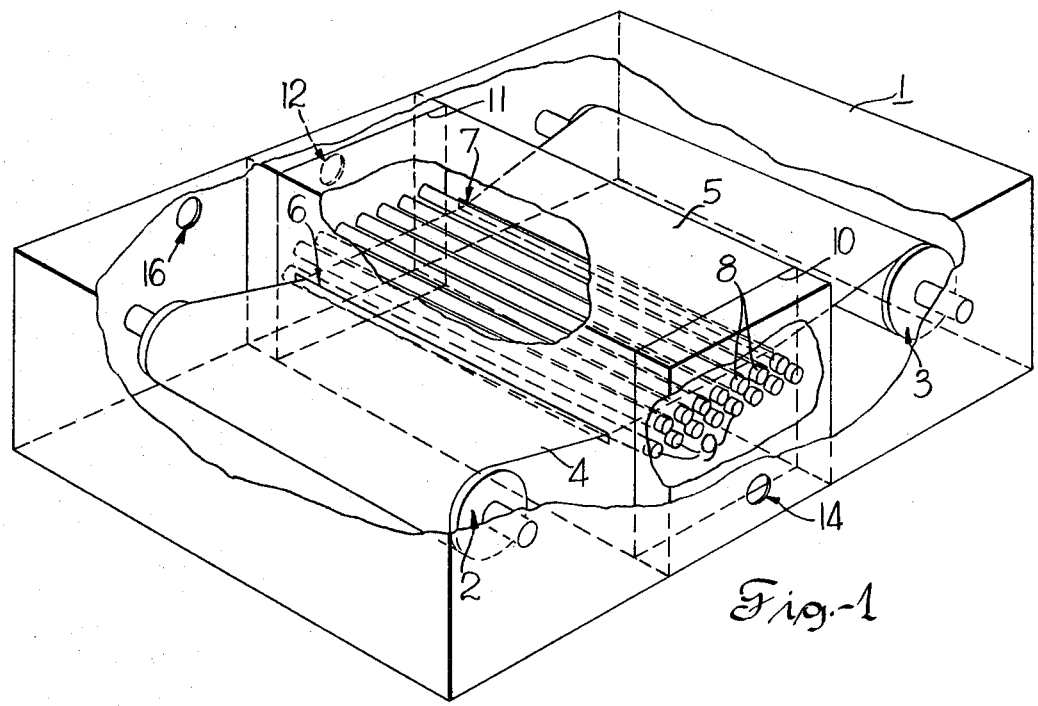
Fig.-1
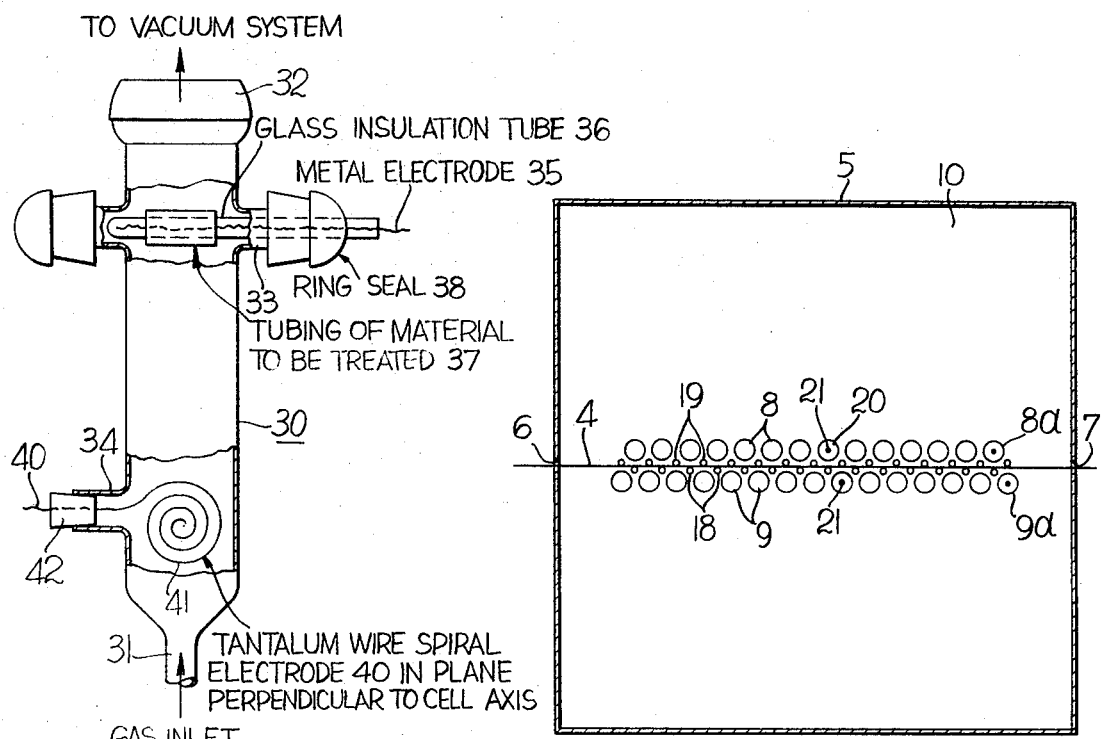
Fig.3
Fig.2
Inventors
Jean P. Manion
Daniel J. Davies
By Arthur M. Stock
Attorney

PROCESS FOR INCREASING WATER REPELLENCY OF COTTON CLOTH

CROSS REFERENCE TO RELATED PATENT APPLICATIONS

The process for producing a material having a fluorinated surface on a substrate disclosed herein is also the subject of a divisional application Ser. No. 188,670 filed Sept. 22, 1971. The process for increasing the water repellency and wet strength of paper disclosed herein is the subject of a divisional application Ser. No. 188,671 filed Sept. 22, 1971. The process for increasing the corrosion resistance of polyethylene disclosed herein is the subject of a divisional application Ser. No. 188,672 filed Sept. 22, 1971. The material of manufacture disclosed herein is the subject of a divisional application Ser. No. 182,904 filed Sept. 22, 1971.

BACKGROUND OF THE INVENTION

1. Field of the Invention

This invention relates to a product and a process for making the product, utilizing an electrical discharge to improve certain desired surface characteristics of certain nonmetallic materials and in particular for improving the water repellency of textiles and paper materials and corrosion resistance of polymeric materials; while maintaining unchanged such characteristics of the bulk of the material as the mechanical strength, the dielectric strength, and the resistance to thermal degradation. The field to which the present invention relates therefore encompasses treatments for providing a material with a combination of properties, i.e., properties associated with the surface and properties associated with the bulk of the material, not characteristic of the material before treatment.

2. Description of the Prior Art

Although a wide variety of polymeric materials are available, both natural and synthetic, the desired combination of properties (at least at prices required for practical commercial applications) is frequently not found in any one material. Formulations involving mixtures of compatible material with filler are frequently resorted to but with only limited success.

For the special need for materials having such as the previously mentioned desired surface properties combined with desired properties characteristic of the bulk of the material, graft polymerization has been used to apply a surface graft having the desired surface properties, on to a base of a polymeric material having other desired properties. According to the prior art this may be accomplished in either of two ways. One way is to activate a polymer surface with high energy radiation or an RF discharge in the presence of an eligible monomer as described in U.S. Pat. No. 3,068,510 to Coleman. A second approach known to the prior art involves the use of a polymer made under conditions which preserve an active site for the later graft reaction. In the first approach the radiation level required for significant surface treatment results in excessive cross-linking of the base material and subsequent loss of desirable bulk properties. The second approach is limited in application to special systems such as condensation polymers[1,2].

([1]"Atomic Radiation and Polymers," A. Charlesby, Pergamon Press (1960) p. 498 et seq.)
([2]Chapiro, A., J. Polymer Sct. 23 377 (1957).)

Graft polymerization, by whatever prior art approach it is achieved, involves a disadvantage when applied for the purpose of making such as a tenting material or wearing apparel water repellent. The disadvantage of graft polymerization is a result of complete surface sealing, including pores, which eliminates the property of air breathing so important to providing a comfortable rain repellent apparel or tenting material.

It is also known to the prior art that surfaces of natural and synthetic fibers (woven or nonwoven) may be treated with an electrical discharge in certain gaseous mediums to provide increased adhesion and wetting properties important to providing a surface which, for example, adheres to other materials or provides improved ink and dye retention, resistance to corona degradation, slip and antistatic properties. Adhesion, however, is a characteristic that may be viewed as being the opposite of water repellency. The gases used in these prior art practices to increase adhesive properties are inoperative to increase water repellency and corrosion resistance of materials so treated, which is sought and achieved, as will be later explained, by the present invention. Certain U.S. patents may be identified which are examples of this prior art approach (i.e., treating a surface to increase its adhereability and wetability rather than applying a graft by either of the heretofore described graft approaches). For example, the prior art described in U.S. Pat. No. 3,291,712 to McBride discloses that perfluorocarbon polymers are very resistant to corrosion and the action of most chemicals and solvents. The McBride patent further states that perfluorocarbon polymers are therefore used to line pipes and vessels used to transport or store chemicals but that perfluorocarbon polymers do not adhere well to such surfaces. This McBride patent also discloses treating the surface of a perfluorocarbon polymer web with an electrical discharge in the presence of an amine vapor to render the perfluorocarbon web strongly adhereable to other materials so it can be easily applied to and will adhere well to pipes, vessels and the like.

Another example of a prior art patent related to treating polymeric-shaped structures to increase their adhereability to other materials and their wetability by other materials (i.e., ink, dye, etc.), is U.S. Pat. No. 3,255,099 to Wolinski. This Wolinski patent discloses achieving such objects by treating polymeric-shaped structures with an electrical discharge in the presence of a vapor of an inorganic agent having an affinity for electrons.

Still another example of a prior art patent related to treating polymeric-shaped structures to improve its adhereability and in this case also its heat sealability, is another U.S. patent to Wolinski U.S. Pat. No. 3,255,089. This Wolinski patent discloses treating the surface of polymeric-shaped structures with an electrical discharge in the presence of an organic compound selected from the group consisting of polymerizable organic compounds, nonpolymerizable compounds having replaceable hydrogen atoms, and perhalohydrocarbons having a bond disassociation energy for the carbon halogen bond below 100 kilocalories. The stipulation that perhalohydrocarbons having a carbon-halogen bond below 100 kilocalories, in order to be within the scope of Wolinski's teachings, makes it completely clear to those skilled in this art, among whom the present inventors number themselves, that the Wolinski teaching excludes fluorine-containing perhalohydrocarbons such as are involved in the present invention, in different mechanisms and for different purposes, as will appear from the description to follow.

SUMMARY OF THE INVENTION

It is the object of the present invention to provide new and improved materials by a process for upgrading the value of certain low cost materials to thus providing new and more useful materials, by treating the surface thereof to impart properties to the surface that are equal to or superior to properties of relatively high cost materials.

Another object of the present invention is to provide an inexpensive process for upgrading the value of certain already relatively expensive materials by treating the surface thereof to further improve desired surface properties that are already possessed by and characteristic of such materials, and thereby increase the economic justification for using such expensive materials.

More specific objects of the present invention include providing a process for treating materials to improve the surface properties such as water repellency to make such materials more useful and comfortable for such as tenting and rain repelling apparel; and for treating materials to improve surface properties such as corrosion resistance to make such materials more useful for such as coating or wrapping wires and cables for underground burial.

These and other objects that are achieved in a manner that will be described, involve attaining goals which are the exact opposite of increasing adhereability, wetability, etc. which are the goals of the described prior art. It is in the nature of a discovery by the present inventors that the achievement of the objects of this invention requires a material to be treated which has in its surface hydrogen atoms which may be present in hydroxyl groups attached to a carbon atom chain, and a treating gas containing fluorine atoms or fluorine containing radicals. As will appear as the description of this invention proceeds, this invention does not involve graft polymerization (e.g., Coleman) nor does this invention involve treating a surface to make it more adhereable to other materials (e.g., Wolinski). This invention does, however, involve an electrical discharge being utilized to chemically activate both a surface containing hydrogen atoms or hydrogen radicals and a treating gas containing fluorine atoms or fluorine radicals (with gaseous perfluoro compounds proving most satisfactory) resulting in an exchange of the fluorine atoms or radical for the hydrogen atom or radical, and the production of a surface that is more water repellent (without sealing pores), more corrosion and soil resistant, more chemically inert and more like the relatively expensive polytetrafluoroethylene which is known by the DuPont trademark TEFLON, than was the surface before such treatment.

Materials which can be used as a substrate to be treated by the present invention, and which possess hydrogen atoms with or without hydroxyl radicals, attached to a carbon chain molecule include such as cotton, wool, rayon, paper and the cellulosic polymers, polyethylene, polypropylene, and the polyolefins, nylon, Dacron, Orlon (Dacron and Orlon are DuPont trademarks), and the polyesters, polyvinyl fluoride and the polyvinyl and polyacrylic polymers, epoxy, phenol formaldehyde, polyurethane, and a great many other such materials.

Treating gases containing fluorine atoms or radicals, operative with the present invention include the following perfluoro compounds $CF_4$, $C_2F_6$, $C_3F_8$, $C_4F_{8(c)}$, $CHF_3$, and $SF_6$.

For treating some materials, for example polyethylene, a preferred process according to the present invention may include a pretreatment in helium gas to cleanup and activate the polyethylene surface for better treatment thereafter by the fluorine atom containing gas.

TESTS AND MEASUREMENTS

In the description of the invention to follow many examples will be described and evaluated relative to each other and control (untreated) samples of the same materials treated according to this invention. In order to present such evaluations certain tests and measurements were used which will now be described.

WATER REPELLENCY

Two tests for water repellency were used. One test was a static water drop test. This test consisted of placing drops of distilled water on a fabric surface to be tested using a spacing of approximately 1 drop per square inch. Delivery of the drops to the fabric surface was from a standard pipette to assure reasonable reproducibility of size. Water repellency rating was taken to be the time after drop addition to the first sign of fabric wetting, penetration or wicking for any drop. The untreated control samples of cotton or paper tested absorbed a water drop completely in 1–3 seconds. The untreated control samples of synthetic cloths absorbed the drop completely in 1–5 minutes. Typically, a cloth, natural or synthetic, or paper, treated according to the present invention, maintained 28 drops for 24 hours (a 28 square inch sample was usually tested).

A second test conducted for water repellency was the ASTM D–583–63 static immersion test (1968 Book of ASTM Standards — Part 24 — Textile Materials, American Society for Testing and Materials, Philadelphia, Pa.). The samples, after conditioning at a relative humidity of 65 percent, were weighed, immersed in water at an average hydrostatic head of 3.5 inches for 20 minutes at ambient temperature. The samples were then placed between two pieces of dry blotting paper and passed through a wringer having a constant load to remove interstitial water and reweighed. The percentage weight gain is taken to be due to the water absorbed.

TENSILE STRENGTH

Tensile strength of both dry and wet kraft paper was measured. One-half inch strips, 5 mils thick and 8 inches in length were cut from treated paper and from untreated paper and the tensile strengths measured with an Instron Model TT–C Universal Testing apparatus. The use of a liquid immersion test attachment permitted wet strength tests to be performed with the water level several inches above the upper Instron jaw.

FLUORINE ANALYSIS

Polyethylene film, cotton cloth and kraft paper samples were analyzed for fluoride content using a micromethod of Yamamura et al., (Analytical Chemistry, volume 34, page 1,308 of 1962) with minor modifications. Lanthanum nitrate was substituted for cerium nitrate, the complexing agent. It was also necessary to ignite the samples wrapped in a platinum screen in an oxygen-filled, taped, quartz flask containing water to obtain the fluoride in water-soluble form. The method, as modified, was calibrated with known samples prepared from a standard sodium fluoride stock solution.

CORROSION MEASUREMENTS

The resistance of treated polyethylene surfaces to accelerated oxidative attack was determined by the immersion of treated samples according to the present invention in concentrated anhydrous chromic acid solution (150 milliliters conc. $H_2SO_4$/40 grams of $Na_2Cr_2O_7$) at 75° C. and measuring their weight loss. Treated samples, together with an untreated control sample of polyethylene and a similar sample of polytetrafluoroethylene were oven-dried and weighed before and after various times of acid contact.

BRIEF DESCRIPTION OF THE DRAWING

FIG. 1 is a diagramatic illustration of an apparatus operative to demonstrate the present invention;

FIG. 2 is a side view of the electrode arrangement in apparatus shown in FIG. 1;

FIG. 3 is a diagramatic illustration of an early model of a batch apparatus operative to practice the present invention;

DESCRIPTION OF THE PREFERRED EMBODIMENTS

Figure 4:
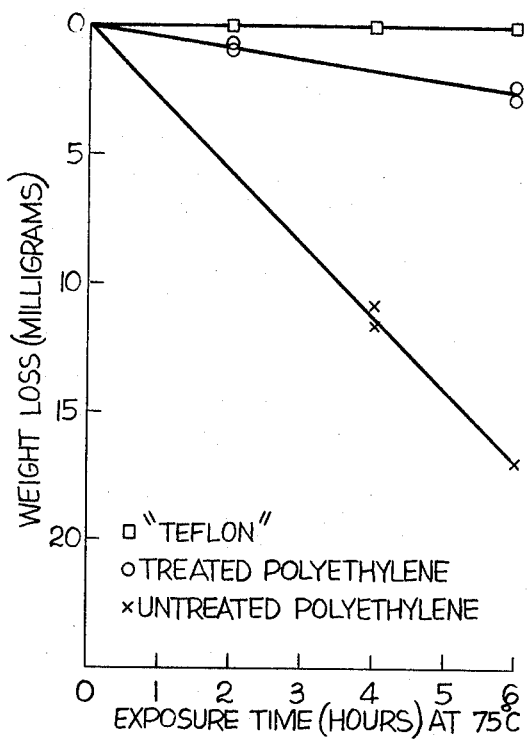
FIG. 4 is a graph depicting corrosion resistance of materials.

Referring to FIGS. 1 and 2, a device for practicing and demonstrating the present invention includes a chamber 1 containing a supply roll 2 and a take-up roll 3 with a span of substrate material 4 extending therebetween through an inner chamber 5. The inner chamber 5 is provided with guide slits 6, 7 aligned to position a midportion of span 4 between an upper array of electrodes 8 and a lower array of electrodes 9. The electrodes 8, 9 are supported at their end portions by support walls 10, 11. Suitable means (not shown) may be applied to roll 3 to rotate roll 3 and draw material through the inner chamber 5. The inner chamber 5 is also provided with an evacuation port 12 for connection to a standard pump (not shown) such as a Welch Model 1397. The chamber 5 is also provided with a treatment gas inlet 14 for connection to gas supply sources (not shown). As shown in FIG. 2, the support walls 10, 11 are provided with gas flow holes 18 in wall 10 below the span of material 4 and gas flow holes 19 above span 4 in wall 11. Gas admitted at 14 thus passes over and beneath the material 4 before being drawn out at 12. The gases used in the examples which will be described, were of commercial grades of $CF_4$(95–98%); $CHF_3$(98%); $C_2F_6$(99.6%); $C_4F_{8(c)}$(99.99%); $CCl_2F_2$(99%); $SF_6$(90–94%); $N_2$(98%) and helium (99.99%) produced by the Matheson Company Inc., and such gases with no further purification were used at the selected pressure, measured at a port 16 at extremely low flow rates, e.g., 5 millimoles of gas per minute.

Each electrode comprises a glass or metal tube 20, which may be for example a tube of borosilicate glass of 6 mm outside diameter, and contains a filament 21 which may be a wire, a roll of metal foil or an electroplated metallic deposite on the inner surface of the tube. Each electrode of the upper electrode array 8 is connected electrically in parallel as were the electrodes of the lower array 9. Power was connected at electrodes 8a and 9a. The power source used (not shown) was a Lepel Model T-2.5-1-KC-M-S high frequency induction heating unit which was modified to drive an air core, high frequency transformer for the production of high voltage in the 200 to 500 kc frequency range. Electrical power dissipated in the chamber 1 was determined with a Tetronix oscilloscope, Model 536, equipped with an electronic switch. Discharge voltage and current were observed simultaneously and the phase angle and frequency measured. Because the filament 21 is within such as a glass tube, the discharge is such as is known to those skilled in related arts as an "electrodeless" discharge.

Referring to FIG. 3, an apparatus is shown that is an early model of a batch apparatus used to treat materials in tubular form. This apparatus has a cylindrical cell 30 with a gas port 31 and a gas outlet port 32 for connection to a vacuum system (not shown). Openings 33, 34 are provided in cell 30 perpendicular to the gas inlet port 31 and gas outlet port 32. A metal electrode 35 is arranged within a closed end glass insulation tube 36 which projects through opening 33 into cell 30. A tubular sample 37 of material to be treated is arranged over the glass tube 36 to be centrally located within cell 30. A ring seal 38 is provided to prevent treatment gas escaping around the periphery of tube 36. A tantalum wire spiral electrode 40 projects through opening 34 and is arranged to present the plane of the spiral 41 perpendicular to a central axis through cylindrical cell 30. The wire electrode 40 is drawn through a seal 42 inserted in opening 34. The power source is a Cenco Tesla Coil, catalog number 80,700, driven by a 15 KV, 60 milliampere neon sign transformer and spark gap. Maximum primary circuit power was 50 watts. Although load output was not determined, the known inefficiency of this power unit accounts for the time required for effective treatment of polyethylene. As will be shown, treatment time and treatment power are inversely related. Treatment time can be reduced with increase in power and more efficient use of the power supplied than was possible with the Tesla unit used.

The present invention as practiced with either the apparatus of FIGS. 1, 2 or FIG. 3, provides a general polymer surface treatment technique which renders polymer film and solid surfaces (as opposed to porous or woven) more chemically inert like "Teflon" and which produces an equally chemically inert surface on porous fibers, porous paper, wood and woven textiles, natural and synthetic, rendering them water repellent without change in their porosity or air-breathing characteristics.

In general, surface treatment of the material to be treated, is accomplished by subjecting the material to an electrodeless discharge in an atmosphere of gas within chamber, in which the gas molecules contain fluorine atoms. As will appear from the description of examples to follow gaseous perfluorohydrocarbons have been found to yield the best results with respect to treatment efficiency and absolute treatment achieved.

With the apparatus of FIG. 1, woven textile, polymer or paper sheets are drawn through slit 6, between the upper and lower electrode arrays 8, 9 in chamber 5 and through slit 7 to take-up roll 3. The vertical separation between the upper and lower electrode arrays 8, 9 has been varied and a separation of 0.5 inch between upper and lower electrode centers has been used to advantage with 6 mm. O.D. glass tube electrodes arranged in the arrays 8, 9. As stated previously, each glass tube contains a conducting filament 21 and the upper electrodes 8 are connected electrically in parallel as are the lower electrodes 9. An advantage for the electrode array shown in FIG. 1 is that both sides of the span 4 of film, paper or textile fabric are treated equally and, of course, simultaneously.

PROCESS VARIABLES

Gas Flow Rates and Condition

At the discharge wattages used the lowest gas flow rates measure were found to yield adequate exchange and in examples to be described, was approximately 5 millimoles of $CF_4$ per minute at a pressure of 5 Torr. For continuous operation over extended periods a small recycle pump (not shown) preceded by a chemical absorption chamber (not shown) may be used. The chemical absorption chamber can contain an alkaline substance such as sodium hydroxide or other alkaline material having low vapor pressure to react with the hydrofluoric acid and is followed by a section of drying agent such as 8–14 mesh activated alumina to insure the treatment gas being returned to the treatment chamber 1 as dry as possible. As will be shown later, the efficiency of paper treatment is decreased significantly by the presence of residual moisture in the paper.

GAS PRESSURES

The required pressure of the treatment gas has been found to vary with the type of surface being treated. Thus, although acceptable treatment of the textile fabrics, natural and synthetic, are obtained over a wide range of subatmospheric pressure, optimized treatment occurs over a moderately narrow pressure range around 5 Torr, that is, between about 0.5 and 50 Torr. In the treatment of kraft paper effective treatment is achieved at pressures over the range 0.5 to 400 Torr. In general it has been found that the pressure range in which treatment is optimized is related to the discharge voltage, sinusoidal or pulsed, as the case may be. Optimized pressure is proportional to voltage measured on load. In this connection, a pulsed voltage has been found desirable for film surface treatment with pulse voltage on load exceeding 20,000 volts, while a sinusoidal voltage performs satisfactorily for treatment of the porous and woven fabric materials with load voltages of 1,000 to 3,000 volts proving adequate and it will be noted 2,600 volts were utilized for Examples 4– 8, Table II.

POWER APPLIED (AND ITS RELATIONSHIP TO TREATMENT TIME)

Series A Examples 1–3

A series A of Examples 1–3, set forth in Table I, show that treatment time and discharge power are inversely proportional. For each of these examples the flow rate of the treatment gas was 5.4 millimoles of $CF_4$ per minute at a pressure of 5 Torr. The apparatus of FIG. 1 was used. The treatment times used in most examples are determined primarily by the characteristics and capabilities of the electrical power supplies used. The energy required per unit of surface treated to the present optimized state has been found to be within the accuracy of the measurement 0.2 KWH/yard$^2$ for a variety of surfaces studied including cotton, wool, paper and the synthetic fabrics. Examples shown in Table IV applied 0.2 KWH/yard$^2$ and it will be noted that Example 14 achieved a water repellency test substantially better (i.e., 20.8 percent) than is shown in the following Table I which reports examples utilizing only about 0.07 KWH/yard$^2$.

TABLE I

| Example No. | Power (Watts) | Time (Sec.) | Energy (Kilowatt-sec.) | Water repellency Static immersion Test |
|---|---|---|---|---|
| 1 | 290 | 100 | 29.0 | 42.4% |
| 2 | 585 | 50 | 29.2 | 43.1% |
| 3 | 1260 | 25 | 31.5 | 41.8% |
| Control | — | — | — | 56.8% |

TREATMENT TIME

Series B Examples 4–8

In a series B of Examples 4–8 involving treatment times of from 25 to 400 seconds a span 4 of cloth to be treated with the apparatus of FIG. 1 (bleached and desized 80 × 80 weave cotton) was wound on the supply roll 2 and the end threaded through the guide slits 6, 7 and between the upper electrode array 8 and the lower electrode array 9 and attached to the take-up roll 3. (A series F of Examples 54–91 described later, will involve treatment times as short as 3 seconds).

The treatment chamber 1 was sealed and evacuated via outlet port 12 using a Welch Model 1397 mechanical pump. After evacuation to below 10 millitorr absolute the electrical terminals 21 of the electrodes 8a and 9a were connected to the described source of high voltage continuous wave radio frequency power. For the series B Examples 4–8, $CF_4$ gas was admitted to the chamber via the inlet port 14 and its flow directed over and under the cloth via the gas flow holes 18, 19 (FIG. 2) in the electrode support panels 10, 11.

The $CF_4$ gas pressure was read on a gauge connected to pressure gauge port 16 and adjusted by means of throttling outlet port 12 to the pressure of 5 Torr after setting the flow rate at the valve of the gas supply cylinder (not shown) to a value of 5.4 millimoles/min.

The area of cloth to be treated was moved into the space between electrode arrays 8 and 9, and the electrodes were subjected to an electrodeless discharge of 585 watts peak power at 2,600 volts peak to peak measured at reaction chamber terminals 21, for the length of time indicated in the following Table II. Table II shows how in the treatments of Examples 4–8, series B, the amount of water absorbed was reduced compared to an untreated control sample of the same cotton cloth and the effect of treatment times on the results obtained.

TABLE II

| Series B Example No. | Treatment Time | Water Repellency (Static Immersion Test) |
|---|---|---|
| 4 | 25 sec. | 46.8% |
| 5 | 50 sec. | 43.1% |
| 6 | 100 sec. | 27.0% |
| 7 | 200 sec. | 25.6% |
| 8 | 400 sec. | 24.7% |
| Control | — | 56.8% |

PRETREATMENT WASH

Series C Examples 9–13

The materials used for Examples 9–13 were samples of the same bleached and desized 80–80 weave cotton cloth used for series B Examples 4–8. In Examples 9–13 the samples were first thoroughly washed in distilled water to remove residual chemicals from desizing after which the same steps were followed in the treatment processing and testing as for series B Examples 4–8. The following Table III shows how inclusion of a washing step in the treatment processing of series C examples made the material even more water repellent than the treatment processing of series B as shown in Table II and lowered considerably the length of treatment required to achieve a given degree of water repellency as measured by the immersion test.

TABLE III

| Series C Example No. | Treatment Time | Water Repellency (Static Immersion Test) |
|---|---|---|
| 9 | 25 sec. | 40.0% |
| 10 | 50 sec. | 27.5% |
| 11 | 100 sec. | 19.4% |
| 12 | 200 sec. | 18.8% |
| 13 | 400 sec. | 19.0% |
| Control | — | 56.8% |

NATURE OF THE TREATMENT GASES

Series D Examples 14–49

The same treatment processes with samples of the same cotton cloth described for series C Examples 9–13 were repeated using a variety of treatment gases including another series of four treatment processes using $CF_4$, i.e., Example 14 using $CF_4$ for 100 seconds; Example 15 using $CF_4$ for 50 seconds; Example 16 using $CF_4$ for 25 seconds; and Example 17 using $CF_4$ for 10 seconds. After all treatment processes Examples 14–49 the treated cotton samples were tested for water repellency using the water drop test. After treatment processes with 100 second treatments, i.e., Examples 14, 18, 22, 26 and 30, the treated cotton samples were also tested for water repellency using the static immersion test. For each of these Examples 14–49 the results shown in the following Table IV demonstrate that optimized treatment is (a) restricted to the perfluorocarbon gases, i.e., perhalohydrocarbons having the C–X bond greater than 100 kilocalories (where X = halogen), (b) the presence of hydrogen in a treatment gas molecule decreases significantly the efficiency of surface treatment achieved, (c) the presence of chlorine results not only in a decrease in efficiency (longer treatment time required) but in a significant decrease in the maximum amount of water repellency which could be obtained for any treatment time used and (d) the use of $N_2O$, an oxidizing agent and electron receptor resulted in no treatment as measured by the water repellency tests.

TABLE IV

| series D exam. no. | Gas | Water Repellency Static Immersion Test Control = 56.8% 100 sec. | Treatment Time-(Seconds) 100 sec. | 50 sec. | 25 sec. | 10 sec. |
|---|---|---|---|---|---|---|
| | | | Water Repellency Water Drop Test Control = 1–3 sec. | | | |
| 14–17 | $CF_4$ | 20.8% | 7.75 hrs. | 7.75 hrs. | 7.50 hrs. | 3.75 hrs. |
| 18–21 | $C_4F_{8(c)}$ | 24.0% | 8.25 | 7.50 | 8.25 | 2.00 |
| 22–25 | $C_2F_6$ | 26.0% | 8.25 | 8.25 | 8.25 | 3.50 |
| 26–29 | $CHF_3$ | 29.0% | 8.00 | 6.00 | 4.25 | 0.50 |
| 30–33 | $SF_6$ | 25.0% | 8.00 | 2.50 | 0.50 | 0.25 |
| 34–37 | $CClf_3$ | | 0.30 | 0.08 | 0.07 | 0.05 |
| 38–41 | $CCl_2F_2$ | | 0.12 | 0.08 | 0.03 | 0.02 |
| 41–45 | $CCl_4$ | | 0.17 | 0.05 | 0.03 | 0.03 |
| 46–49 | $N_2O$ | | 0.00 | 0.00 | 0.00 | 0.00 |

As appears from examples described, treatment gases are those containing the fluorine atom, with perfluoro compounds such as $CF_4$, $C_2F_6$, $C_4F_{8(c)}$, $C_3F_8$, and $SF_6$ the most satisfactory. The presence of hydrogen as in $CHF_3$, in the treatment gas results in decreased efficiency and the presence of chlorine as in $CCl_2F_2$, reduces the amount of treatment achieved to almost negligible amounts. Gases such as tetrafluoroethylene, hexafluoropropylene, are conceived as being good treatment gases. However, because of their unsaturation, polymerization as well as chemical replacement occurs and the polymerization reaction predominates. Fabrics treated in an atmosphere of $C_2F_4$ quickly lose their "hand" and suffer loss of their air-breathing property. Similarly, reagents such as $BF_3$ and $SiF_4$ are conceived as being good treatment gases. However, because of their rapid chemical reaction with even traces of moisture to yield the white powdered products, $H_3BO_3$ and $H_4SiO_4$ respectively, their use in a process requiring frequent opening of the reactor would result in contamination of the reactor and of treated porous materials with the $H_3BO_3$ or $H_4SiO_4$ and HF produced in their reaction with the moisture in the air.

MATERIALS TREATED — TEXTILE FABRICS OTHER THAN COTTON

Series E Examples 50–53

Examples 1–49 all involve cotton and Examples 50–53 of Series E, involve treating a variety of textile fabrics other than cotton, according to the present invention. For these examples the treatment gas was $CF_4$, at a pressure of 5.0 Torr and with a flow rate of 5.4 millimoles for treatment times of 50 and 100 seconds as indicated in Table V, which were also the conditions for the cotton Examples 5 and 6 of series B set forth in Table II. In the following Table V the Examples 5 and 6 are repeated for convenience in comparing with cotton the examples processing wool, rayon, nylon and Dacron.

TABLE V

| Example Number | Fabric | Treatment Time (Sec.) | voltage (max. peak to peak volts) | Power (Watts) | Water repellency Static Immersion Test |
|---|---|---|---|---|---|
| 5 | Cotton | 50 | 2600 | 585 | 43.1% |
| Control | Untreated Cotton | — | — | — | 56.8% |
| 50 | Rayon | 50 | 2400 | 495 | 20.0% |
| Control | Untreated Rayon | — | — | — | 32.8% |
| 51 | Nylon | 50 | 2700 | 610 | 10.8% |
| Control | Untreated Nylon | — | — | — | 14.6% |
| 6 | Cotton | 100 | 2600 | 585 | 27.0% |
| Control | Untreated Cotton | — | — | — | 56.8% |
| 52 | Wool | 100 | 2600 | 310 | 21.3% |
| Control | Untreated Wool | — | — | — | 45.8% |
| 53 | Dacron | 100 | 2700 | 560 | 14.3% |
| Control | Untreated Dacron | — | — | — | 19.3% |

It is seen in the data of Table V that significant improvements in water repellency are obtained for all fabrics treated and that even nylon, which is relatively water repellent before treatment, is improved by treatment.

MATERIALS TREATED — CELLULOSE-PAPER

Series F Examples 54–91

Table VI to follow discloses the data obtained from a series F of Examples 54–88, Table VI discloses data from Example 89–90, and Table VIII discloses data from an Example 91.

In Examples 54–91 the surfaces of a 5 mil thick Dryden kraft paper of intermediate porosity were treated with $CF_4$ treatment gas at pressures from 0.5 to 300 Torr and with treatment times of 5 to 50 seconds for the examples in Table VI and of 100 seconds for the examples in Tables VII and VIII. It was noted that a well dried paper yields a significantly more effective treatment. The data indicate that pressures of $CF_4$ up to 300 Torr result in satisfactory treatment in the treatment time range of 25 to 50 seconds at the power level used.

The data of Table VI also shows that satisfactory treatment may be obtained with shorter treatment if the power is raised sufficiently. It can be noted that Examples 64–68 demonstrate that with a pressure of 50 Torr and relative discharge power 1.0 (the absolute discharge power being 0.2 $KW/yd^2$) that effective treatment was not obtained with treatment times less than 25 seconds. However, Examples 84–88 show that increasing the power provided effective treatment with treatment times as short as 3 seconds.

TABLE VI

| Example Number | Gas Pressure (Torr) | Relative discharge Power | Water Repellency Water Drop Test (control for Untreated Sample = 1–3 sec.) Treatment Times in Seconds Water Drop Test in Hours | | | | |
|---|---|---|---|---|---|---|---|
| | | | 50 sec. | 25 sec. | 12 sec. | 6 sec. | 3 sec. |
| 54–58 | 0.5 | 1.0 | 6.00 | 3.50 | 1.50 | * | * |
| 59–63 | 5.0 | 1.0 | 5.25 | 5.00 | 5.25 | 4.25 | 4.25 |
| 64–68 | 50.0 | 1.0 | 7.00 | 4.25 | * | * | * |
| 69–73 | 100.0 | 1.0 | 7.25 | 7.25 | 6.00 | 6.00 | 0.50 |
| 74–78 | 200.0 | 1.5 | 5.00 | 5.00 | * | * | * |
| 79–83 | 300.0 | 2.0 | 5.50 | 5.50 | 5.25 | 5.00 | 0.16 |
| 84–88 | 50.0 | 1.5 | 7.00 | 6.25 | 5.25 | 4.25 | 1.50 |

* No Test Made

Since Tables II and III indicated that little gain was achieved by extending treatments beyond 100 seconds, the conditions of Examples 59–63 (except for time) were repeated for 100 seconds as Examples 89 and 90 and results are shown in the following Table VII.

TABLE VII

| Example Number | Gas Pressure (Torr) | Discharge Power | Treatment Time | Water Repellency Static Immersion Test |
|---|---|---|---|---|
| 89 | 5.0 | 0.2 $KWH_2$ per yd. | 100 sec. | 39.2% |
| 90 | 5.0 | 0.2 $KWH_2$ per yd. | 100 sec. | 41.1% |
| Control (i.e., untreated kraft paper) | | | | 82.0% |

Tables VI and VII therefore show by Examples 54–90 of the present invention, that water repellency of kraft paper as measured by the water drop test has been increased from a matter of 1 to 3 seconds, to a matter of several hours; and as measured by the static immersion test, the water repellency of kraft paper has been doubled.

Samples of the 5 mil thick Dryden kraft paper of intermediate porosity were treated using the gas $CF_4$. Treatment time was 100 seconds and the discharge power was 650 watts at a load voltage of $2.3_{(pp)}$. One-half inch strips, 8 inches in length, were cut from the treated paper and from untreated paper and the tensile strengths measured with an Instron Model TT-C Universal Testing apparatus, in air, and with the use of auxiliary liquid immersion test equipment, under a 6–12 inch head of distilled water. The results are given in Table VIII.

TABLE VIII

Example    Tensile Strength in lb. 1 in.$^2$    (averaged)

| Number | In Air | After Under Water for 30 Seconds |
|---|---|---|
| 91 | 10,625 | 2,900 |
| Control | 10,460 | 280 |

It is seen from the data in Table VIII that no significant change in dry paper tensile strength has resulted from the treatment according to this invention. However, upon comparison of the tensile strengths measured under water it is shown that the treated samples retain approximately one-third of their dry tensile strength while the untreated control fell to a value of one thirty-seventh of the average dry strength for a net gain in wet tensile strength of 10 for the treated paper.

MATERIALS TREATED — POLYETHYLENE

Series G Examples 92–105

Examples will now be given of the present invention applied to tubular samples polyethylene treated with the apparatus shown in FIG. 3. Samples so treated will be tested to measure resistance to corrosion in the manner described in the section entitled TESTS and MEASUREMENTS. This approach has been chosen because polyethylene as a tubular sheath has been found to be particularly useful to protect wires and cables for underground burial. In this use for polyethylene it is known that the main factor contributing to degradation of the electrical insulating properties of the polyethylene coating is oxidative degradation ("Underwater Degradation of Polyethylene for Wire Insulation" a paper presented by Yoshida, Tsunemi, Hasebe, Morikuni and Fukuda, Teruo at the 15th Annual Wire and Cable Symposium, Atlantic City, New Jersey, U.S.A., Dec. 8, 1966).

EXAMPLE 92

A 2 cm long section of ¼ inch I.D., ⅜ inch O.D. polyethylene tubing was placed on the combination electrode/sampler holder tube 36 in the cell 30 (FIG. 3) and the cell evacuated via the outlet port 32. Helium gas was introduced into the cell 30 through port 31 at a constant slow flow rate and at a pressure of 0.12 Torr. The two electrodes 35, 40 were connected to the output terminals of a Cenco No. 80700 Tesla coil powered by a Cenco No. 80365-3 high voltage transformer which in turn was energized by a 60 Hz, 28V rms source. The resulting discharge containing pulses of up to 35 KV was contained for a total of 8 minutes with the sample holder 36 and sample 37 rotated 1 revolution during this time to insure uniform exposure of the outer surface of the sample to the discharge.

Following this pretreatment, the helium gas was turned off and the $CF_4$ treatment gas introduced at a pressure of 0.5 Torr and substantially the same flow rate. A discharge of essentially the same characteristics was carried out in the $CF_4$ environment for a total of 20 minutes with the sample holder 36 and sample 37 again rotated 1 revolution during this time to assure uniform exposure of the sample surface.

After treatment the sample 37 was removed from the treatment cell and oven dried to constant weight, along with an untreated control and a similar sample of the premium price polytetrafluoroethylene ("Teflon"). The weighed sample, control and polytetrafluoroethylene were then immersed in the oxidizing, corrosive environment provided by chromic acid solution at a concentration typically used for cleaning glassware, 150 ml conc. $H_2SO_4$, + 40g $Na_2Cr_2O_7$ at 75 ± 1° C. for 6 hours, following which the sample and control were again dried and weighed. For tubular samples weighing 700± 20 mg and an exposed area of 6 cm² the following results were obtained as set forth in Table IX and plotted in the graph shown as FIG. 4.

TABLE IX

Weight Loss After 6 Hours Immersion in Chromic Acid to 75°C

| | A | B | C | D | E |
|---|---|---|---|---|---|
| treated polyethylene samples | 2.6 mg | 2.6 | 2.7 | 3.7 | 2.5 |
| control (untreated polyethylene) | 19.3 mg | 19.4 | 20.6 | 20.7 | 22.2 |
| "Teflon" | 0.1 mg | | | | |

EXAMPLE 93

Two samples of tubing, as used in Example 92, were treated in the manner described in Example 92 with the single exception that $C_2F_6$ was substituted for $CF_4$ as the treatment gas to indicate the feasibility of using other fluorocarbon gases. The following results were obtained as set forth in Table X.

TABLE X

Wt. Loss After 6 Hrs. Immersion in Chromic Acid at 75°C

| | |
|---|---|
| treated polyethylene sample | 5.7 mg |
| treated polyethylene sample | 5.8 mg |
| control (untreated polyethylene) | 18.3 mg |

EXAMPLE 94

A 2 × 2.5 cm sample of 6 mil polyethylene film was wrapped around the sample holder 36 of the cell 30 and subjected to the same treatment described in Example 92. The film was then removed and rewrapped on the holder with the opposite side of the film exposed to the discharge region. This side was then subjected to the same treatment. The sample was then dried, weighed and tested in 75 ± 1° C. chromic acid giving the results shown in the following Table XI.

TABLE XI

Wt. Loss After 6 Hrs. Immersion in Chromic Acid at 75°C

| treated polyethylene sample | 3.1 mg (total film weight = | 60.8 mg) |
|---|---|---|
| control (untreated) | 20.5 mg (total film weight = | 63.2 mg) |

Figure 5:
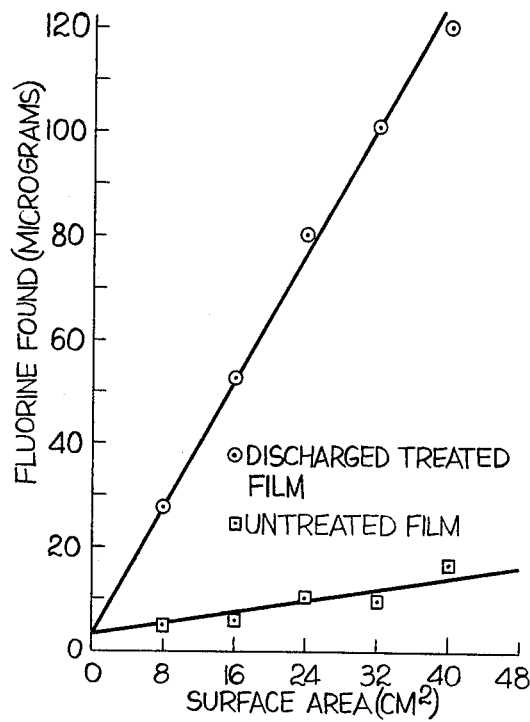
FIG. 5 is a graph depicting fluorine content in the surface of materials.

A series of samples of 6 mil polyethylene film were treated in accordance with the procedure of Example 94 and along with similar untreated samples were analyzed for fluorine content by the method described under the heading "Fluorine Analysis" in the section entitled TESTS and MEASUREMENTS. A plot of the results obtained showing fluorine content vs. surface area is shown in FIG. 5. These results show that the treatment fluorinates the surface to the extent of 2.79 mg of fluorine per cm² of surface area.

EXAMPLES 95 and 96

A series of three samples were treated, one repeating Example 92 and two (Examples 95 and 96) following the procedure of Example 92 but with the time duration of the helium discharge varied, in each case the sample was rotated 1 full revolution during the helium discharge. The following results shown in Table XII were obtained which indicate the added desirability of pretreatment prior to the treatment in the fluorocarbon gas discharge:

TABLE XII

| Example | Helium Discharge Time | Wt. Loss Due to Corrosion in Chromic Acid |
| --- | --- | --- |
| 95 | 4 min. | 13.5 mg |
| (Example 92) | 8 min | 2.5 mg |
| 96 | 16 min. | 2.4 mg |

EXAMPLES 97–99

Three samples of polyethylene tubing as described in Example 92 were treated in accordance with the procedure of Example 92 except that the helium pressure used during the helium discharge was varied. The following results shown in Table XIII were obtained which show that low pressure is required for the pretreatment step. The amount of weight loss due to corrosion is seen to increase sharply at the highest of the three pretreatment pressures used.

TABLE XIII

| Example | Helium Discharge Pressure | Wt. Loss During Chromic Acid Corrosion |
| --- | --- | --- |
| 97 | 0.06 Torr | 2.7 mg |
| 98 | 0.12 Torr | 2.9 mg |
| 99 | 0.24 Torr | 9.65 mg |

EXAMPLES 100–102

Three samples of polyethylene tubing were treated and tested according to the procedure described in example 92 except that the time of exposure to the $CF_4$ discharge was varied. The following results shown in Table XIV were obtained showing the effect of the treatment time in the fluorocarbon gas discharge.

TABLE XIV

| Example | Treatment Time to $CF_4$ Discharge | Wt. Loss During Chromic Acid Corrosion |
| --- | --- | --- |
| 100 | 10 min. | 4.9 mg |
| 101 | 20 min. | 2.5 mg |
| 102 | 40 min. | 3.1 mg |

EXAMPLES 103–105

Three samples of polyethylene tubing were treated and tested in accordance with the procedures described in Example 92 with the exception that the pressure of the $CF_4$ gas during the discharge was varied. The following results shown in Table XV were obtained illustrating the effect of variation in the fluorocarbon gas pressure.

TABLE XV

| Example | $CF_4$ Discharge Pressure | Wt. Loss During Chromic Acid Corrosion |
| --- | --- | --- |
| 103 | 0.250 Torr | 4.9 mg |
| 104 | 0.50 Torr | 2.9 mg |
| 105 | 1.00 Torr | 2.9 mg |

MECHANISM OF THE INVENTION

The mechanism operative in achieving the surface changes described and illustrated in the examples which have been described is describable by a series of chemical steps initiated by the discharge. Although it is not intended to restrict this patent by mechanism, it is felt that the consistency of the data with the explanation of mechanism to follow together with the difference in kind of the changes which are observed to serve to describe the present invention as well as to distinguish it from the inventions and changes achieved in the processes of others, e.g., Wolinski and Coleman which have been discussed under the Description of the Prior Art.

The mechanism, in brief, visualized the activating of a gaseous species containing a desired reactant, for example, the fluorine atom in the presence of the surface with which it is to react. If the surface is sufficiently reactive, the reaction is carried to the limits permitted by reaction equilibria and the surface properties desired.

For the special and somewhat unusual case of a relatively inert surface such as polyethylene, pretreatment of the surface by discharge in helium gas at a pressure low enough to permit effective ion bombardment (and activation of the surface) precedes treatment in the reactant gas. The low gas pressure requirement observed for pretreatment is believed to reflect the need for an average mean free path large enough to insure ion energies capable of rupturing chemical bonds. Polyethylene may be taken as an example of an inert surface requiring both pretreatment and treatment.

Pretreatment in helium at 0.1 Torr

1. Discharge ionization of the helium

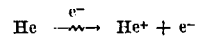

2. Activation of the polyethylene sites by energetic helium ions (a)   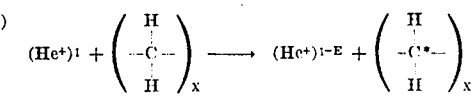

where $* = E$ (energy sufficient to cause rupture of C—H bond).

(b)   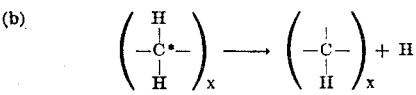

Treatment in $CF_4$ at 5 Torr

1. Discharge activation of $CF_4$

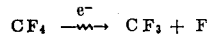

2. Reaction of discharge species with active polyethylene sites (a)   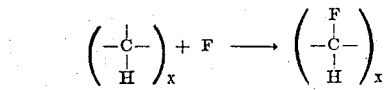

(b)   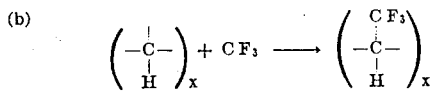

For the case of the more reactive surfaces such as, for example, the cellulosics, cotton or paper, the following equations serve to account for the observed behavior:

Treatment in CF₄

1. Discharge Activation of CF₄

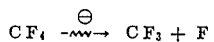

2. Reaction of discharge species with active cellulose surface (a)
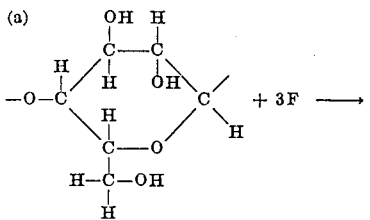

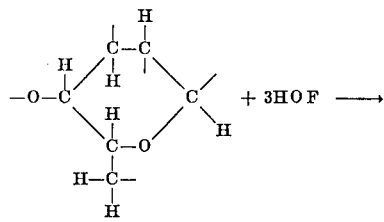

or (b)
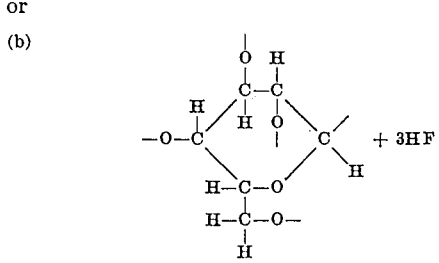

3. Addition of active gas species to the active surface sites (a)
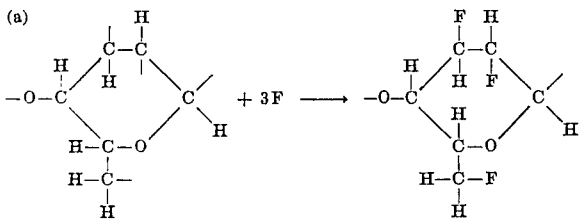

or (b)
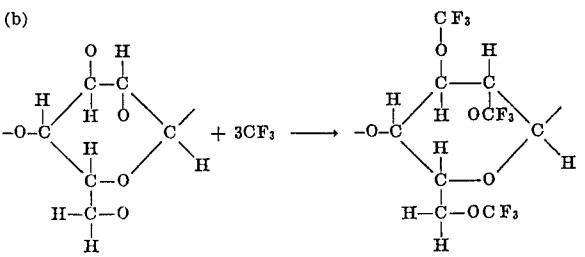

TEST OF MECHANISM

Saturation of Treatment

To distinguish between chemical reaction with the surface as illustrated in the above equations and discharge initiated polymerization onto the surface, the following experiment was devised. A series of 80–80 weave cloth samples were selected to be as uniform as possible and were discharge treated in CF₄ for varying lengths of time over a significantly wider range of treatment time than was used in the treatment optimization study. The samples were then analyzed for fluoride content. If the prevailing treatment reaction is replacement of a surface atom by F or CF₃, saturation of the surface with F should be reached for the samples treated for the excessive time periods and a plot of fluoride content versus treatment time should fall off from a linear relationship. Conversely, if polymerization occurs to any significant extent, no saturation with treatment time should occur and the amount deposited should be deposited linearly in time. Parameters such as discharge power and gas pressure were maintained constant.

Figure 6:
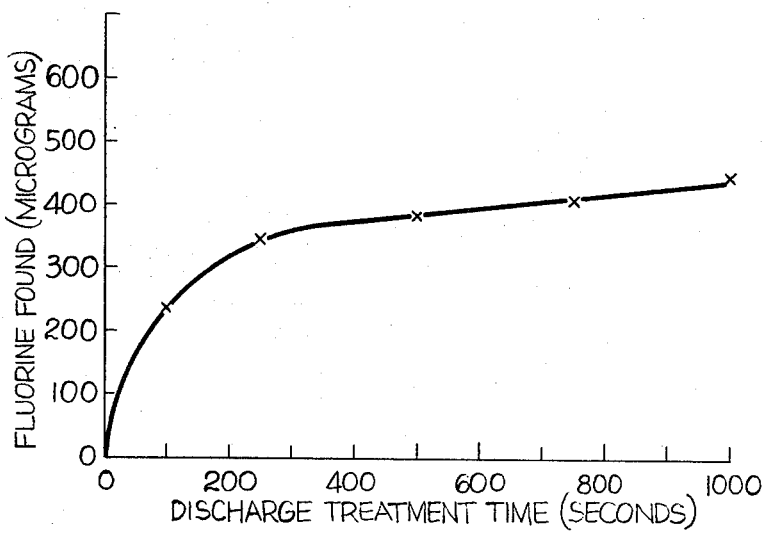
FIG. 6 is a graph depicting the effect of exposure time of a material to a treatment according to the present invention.

The results, FIG. 6, show the rate of the fluoride content addition to the cotton samples to fall off rapidly after 100 seconds of treatment and remain almost unchanged after 250 seconds indicating that deposition by polymerization is very limited or completely absent.

Correlation Between Calculated Fluoride Content of Saturated (Perfluorinated) Polyethylene Surface and the Fluoride Found in Analyzed Samples Treated According to Example 94

Polyethylene films, 6 mils thick, and having macro surface areas of 4 square centimeters were discharge treated in CF₄ on both sides as described in Example 94 were analyzed for fluoride using a modification of the method of "Fluorine Analysis" which has been described. The results, plotted in FIG. 5, show a fluoride content of the treated film to be linear in treated area. After correction for a low concentration of fluoride in the untreated polyethylene, discharge applied fluoride is calculated from FIG. 5 to be 2.79 micrograms of fluoride per square centimeter of treated surface.

One can with the help of some simplifying assumptions calculate an approximate number of replaceable surface hydrogen atoms on a polyethylene surface area for comparison with the observed fluorine atoms found per unit of macro area. If one assumes a polyethylene microsurface having an average of 1.25 Angstrom ($10^{-8}$cm.) distance between carbon atoms, based on a $1.54 \times 10^{-8}$ C—C bond distance and an average $$\overset{C}{\underset{C}{\diagdown}}\overset{}{\diagup}\overset{}{C}$$

bond angle of 120°, accessibility of treatment to all surface hydrogen atoms, and for simplicity, uniformity of carbon atom array in the surface plane, one can calculate the potentially replaceable hydrogen atoms as $$\left(\frac{2}{1.25\times10^{-8}}\right) = 2.6 \times 10^{16}$$

atoms/cm² of micro surface assuming two replaceable C-H bonds per carbon atom. An increase of a factor of two to three over this value calculated for a smooth surface can easily be expected depending on the ratio of micro to macro surface. The value observed 2.79 micrograms/cm² for fluorine content of the surface-treated films corresponds to a value of $$\frac{2.79\times10^{-6}\times6\times10^{23}}{19} = 8.8\times10^{16} \text{ atoms/cm.}^2$$

$6\times10^{23}$ = atoms/mole and 19 = grams/atom mole for fluorine, a value quite consistent with the value of $2.6 \times 10^{16}$ atoms/cm² calculated from a model which assumed the replacement of surface H atoms by F atoms.

The assumptions made for the foregoing calculation were intentionally and to a degree necessarily oversimplified. Assumptions of a flat surface and of uniform C—C bond distances in both directions in the surface plane, for example, are oversimplified, but the errors introduced by their assumption would be compensatory and of the same approximate magnitude. Similarly, the assumptions of complete teflonation, that is 100 percent conversion of all accessible C—H bonds to C—F or C—CF₃ bonds and that only the surface is fluorinated lead to presumably smaller and compensatory errors.

One can therefore expect to predict to within at least an order of magnitude the fluorine-content per square centimeter of treated polyethylene film and in particular should be able to posures. It has also been by the foregoing description that the present invention is applicable to a wide range of natural and synthetic polymers in woven or porous sheet form. As expected for the case of perfluorination, increase in water repellency has been found to be a general property change. The water absorption of cotton cloth with a natural water absorption, (ASTM D-583-63), of 57 percent has been reduced to 15-20 percent. Water absorption of wool cloth has been reduced from 58 to 22 percent. Treatment of nylon, which is already water repellent, decreased its water absorption from 15 to 11 percent. Treatment of kraft paper resulted in a reduction of its natural water absorption from 82 to 39 percent and an increase in "wet" tensile strength from 280 lbs/in$^2$ to 3,000 lbs/in$^2$.

These observed desirable changes in properties have been related to the addition of fluorine or fluorine-containing groups to the surfaces in question and new materials having the aforesaid desirable characteristics have been thereby created. Microchemical analysis of polyethylene film surfaces which had been discharge treated and shown to possess seven times the corrosion resistance of untreated films were found to contain 2.79 micrograms of fluorine per cm$^2$ of surface. Similarly, analysis of treated 80—80 weave cotton cloth (water absorption = 29 percent) showed a fluorine content of 21.5 micrograms per square centimeter of macro surface. In general, fluorine content has been shown to be linear in discharge treatment time at short treatment times.

From the foregoing detailed description of the present in- differentiate a surface perfluorination reaction from a polymerization reaction onto the surface. It has been here shown that the calculated value for F atoms/cm$^2$ of surface is $2.6 \times 10^{16}$ which compares very well with the $8.8 \times 10^{16}$ atoms/cm$^2$ found upon chemical analysis of a large group of the treated films. The fact that the measured value is greater than the calculated value is felt to reflect the oversimplified assumption of flat surface. In fact, the microsurface area is significantly larger than the assumed macrosurface area due to the surface roughness.

By the foregoing description of apparatus, process steps and resulting materials of manufacture, it has been shown that by the present invention a treatment process has been found which increases the stability of polyethylene to oxidative attack. A seven-fold decrease in weight loss of treated samples was observed after 6 hours in chromic acid at 75° C. Weight loss of treated samples was 0.47 mg/cm$^2$ compared to 3.4 mg/cm$^2$ for untreated polyethylene for comparable 6 hour exvention, it has been shown how the objects of the invention have been attained in various preferred manners. However, further modifications and equivalents of the disclosed concepts such as readily occur to those skilled in the art are intended to be included within the scope of this invention.

The embodiments of the invention in which an exclusive property or privilege is claimed are defined as follows:

1. A process for increasing the water repellency of cotton cloth including the steps of: selecting a treatment gas from a group consisting of $CF_4$, $C_2F_6$, $C_3F_8$, $C_4F_{8(c)}$, $CHF_3$ and $SF_6$; arranging the cotton cloth between electrodes separated by an insulating material; flowing an atmosphere of the gas between the electrodes and in contact with the cloth at the rate of approximately 5 millimoles per minute under a pressure of between 0.5 and 50 Torr; and applying electric power to the electrodes to expose a unit area of the cotton cloth to an electrodeless discharge of electrical energy of about 0.2 KWH per square yard of cloth.

2. A process according to claim 1 in which said power is applied to subject the substrate in the flowing atmosphere of gas to said discharge until the hydrogen replaced by fluorine provides in said surface at least about 2 micrograms of such fluorine per cm$^2$ of surface area.

3. A process according to claim 1 in which said power is applied to subject the substrate in the flowing atmosphere of gas to said discharge for a period of from 3 to 400 seconds.

* * * * *